United States Patent
Burd

(10) Patent No.: US 8,727,686 B2
(45) Date of Patent: May 20, 2014

(54) DEVICE FOR ATTACHING AN AIRCRAFT MONUMENT

(71) Applicant: B/E Aerospace, Inc., Wellington, FL (US)

(72) Inventor: Peter John Wesley Burd, Carmarthensire (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 13/848,633

(22) Filed: Mar. 21, 2013

(65) Prior Publication Data

US 2013/0280011 A1 Oct. 24, 2013

Related U.S. Application Data

(60) Provisional application No. 61/614,742, filed on Mar. 23, 2012.

(51) Int. Cl.
*F16B 43/00* (2006.01)

(52) U.S. Cl.
USPC ...................................... 411/371.2

(58) Field of Classification Search
USPC .............. 411/119, 337, 368, 371.2, 383, 384; 16/100
See application file for complete search history.

(56) References Cited

U.S. PATENT DOCUMENTS

| | | | | |
|---|---|---|---|---|
| 2,666,252 | A | * | 1/1954 | Temple ............................ 29/432 |
| 3,652,050 | A | * | 3/1972 | Marrujo et al. ................ 248/429 |
| 4,185,799 | A | | 1/1980 | Richards |
| 5,083,727 | A | | 1/1992 | Pompei et al. |
| 5,222,694 | A | * | 6/1993 | Smoot ............................ 244/119 |
| 5,520,357 | A | | 5/1996 | Payne et al. |
| 6,318,672 | B1 | | 11/2001 | Traylor |
| 6,889,939 | B2 | * | 5/2005 | Rouyre et al. ................. 244/131 |
| 7,401,766 | B2 | * | 7/2008 | Schorloff et al. ............. 254/389 |
| 7,429,190 | B2 | | 9/2008 | Hueber |
| 7,748,661 | B2 | * | 7/2010 | Harris et al. ................... 244/131 |
| 2008/0237440 | A1 | | 10/2008 | Lester et al. |
| 2010/0025559 | A1 | * | 2/2010 | Rathbone et al. ............. 248/534 |
| 2011/0309194 | A1 | | 12/2011 | Pangalila |
| 2013/0126673 | A1 | | 5/2013 | Umlauft et al. |

OTHER PUBLICATIONS

EPO, International Search Report and Written Opinion from counterpart International Patent Application No. PCT/US2013/033534.

* cited by examiner

*Primary Examiner* — Roberta Delisle
(74) *Attorney, Agent, or Firm* — Fulwider Patton LLP

(57) ABSTRACT

An aircraft monument mounting system is disclosed having a rail adapted to support a monument panel thereon, the rail including a recess for receiving an attachment device from below. The attachment device comprises a threaded fastener such as a poppet, a lock nut, an eccentric washer, and a thumbwheel. Rotation of the thumbwheel causes the eccentric washer to move the panel laterally, and the lock nut can raise or lower the panel, providing flexibility as to the positioning of the panel without disrupting the attachment point to the aircraft structure.

14 Claims, 5 Drawing Sheets

DEVICE FOR ATTACHING AN AIRCRAFT MONUMENT

CROSS-REFERENCES TO RELATED APPLICATIONS

This application claims priority from U.S. Provisional Patent Application No. 61/614,742, filed Mar. 23, 2012, incorporated by reference in its entirety.

BACKGROUND

Aircraft interior space is made up of various compartments, such as galleys, crew cabins, stowages, closets, lavatories, crew rest quarters, and other facility and storage monuments. These compartments of typically formed by partitions or structural units that separate one compartment from another. To meet airworthiness requirements on commercial passenger-carrying aircraft for the retention of compartments such as galleys attachment or connection devices must be used to secure them to the aircraft's airframe structure. Commonly, these take two forms: type one securing the lower section of the monument to the floor; and type two securing the upper section to the ceiling. Common practice is to manufacture these parts from a combination of aluminum, stainless steel and titanium. These attachments ultimately secure the monuments to the fuselage (or airframe), which may be by means of seat tracks, cross braces, floor beams and other subsidiary parts of the structure.

Floor attachments normally connect to fixed locations, or "hard points," within the cabin. These fittings do not allow relocation of the monuments to a new location, unless seat track mountings are used that allow either fore and aft movement, or lateral movement, along the track depending upon the orientation of the track. However, a full range of motion is typically unavailable for monument attachments in an aircraft. Floor attachments, or flutter points for low load bearing floor attachments, are typically bonded with glue and/or bolted to the monument as a secondary process, following manufacture of the monument's structural composite panel. Such an assembly typically uses a viscous liquid adhesive, and forms part of the basic monument structure. Due to the fact that only limited projection beyond the outer envelope of the monument is allowed, the floor fittings are commonly offset to the inside of the monument, and mounted on the composite panel's surface or through the panel to a greater or lesser degree, dependent upon design. Where variations exist in the position of the monument, or the position of the hard point attachments or seat tracks, the floor fitting has to be installed in that specific location during manufacture, and relocation or repositioning is limited and every orientation, change in monument location or change in foot print size requires a new location for the floor attachments as part of the structure.

The existing monument attachment design leads to a bias stress loading to one skin of the composite panel, which often fails to optimize the load path into the structure and can lead to a requirement for additional reinforcement in the form of a metallic plate or "doubler" to help spread the stress more effectively throughout the monument and avoid stress concentrations. Unfortunately, this not only adds weight to the aircraft, but is an inefficient means to distribute the load. More recent floor attachment designs have required adjustment in the Z direction as well as the X and Y planes for purposes of alignment during the installation onto the aircraft, which increases the inward projection.

On monuments such as galleys, this has led to a variation in the width of compartments in order that the wheels of the service carts or trolleys avoid contact with the inward projection of the floor fittings. This, in turn, does not allow standardization of cart bay doors, except for the widest possible dimension. This also impacts the efficiency of air circulation around carts in chilled compartments, and produces variations in the widths of standard guide or protection parts such as rub/bump strips in order to compensate for the different offsets.

Additionally, with chilled or refrigerated galleys the presence of a sizable metallic component projecting through the cart bay wall produces significant undesirable cold bridges that can compromise the integrity of the chilled compartment, from a thermal resistance point of view, and the result is a failure to maintain the specified compartment temperature for maintaining perishable food stuffs during normal aircraft operations.

Another common issue with floor attachments, especially in older aircraft, is corrosion of metallic parts due to the galvanic action of dissimilar metals and contact with moisture, cleaning chemicals, spilt beverages such as fruit juices, teas, coffee, soda and alcoholic beverages served routinely during catering service on the aircraft. The environment is conducive to corrosion due to the presence of moisture and the opportunity for beverages to spill during turbulence and the amount of cleaning that occurs in the aircraft between flights.

SUMMARY OF THE INVENTION

The present invention is an improved floor attachment system that can be integrated into the base of a monument's structural wall panels during the primary manufacturing process or added to an existing system to improve flexibility and maneuverability. The improved floor attachment maintains the airworthiness requirements of floor attachments while eliminating some of the problems of the prior art. The improved floor attachment uses a rail along the bottom surface of a panel that is supported by a poppet or fastener. The rail is seated on an eccentric washer and actuator such as a thumbwheel, which in turn is seated on a lock nut or two-way locking ratchet. Using the eccentricity of the washer, the rail can be moved laterally through rotation of the washer via the thumbwheel, and raised using the lock nut or locking ratchet. In this manner, the monument can be raised or lowered and moved laterally without disruption of the attachment points.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
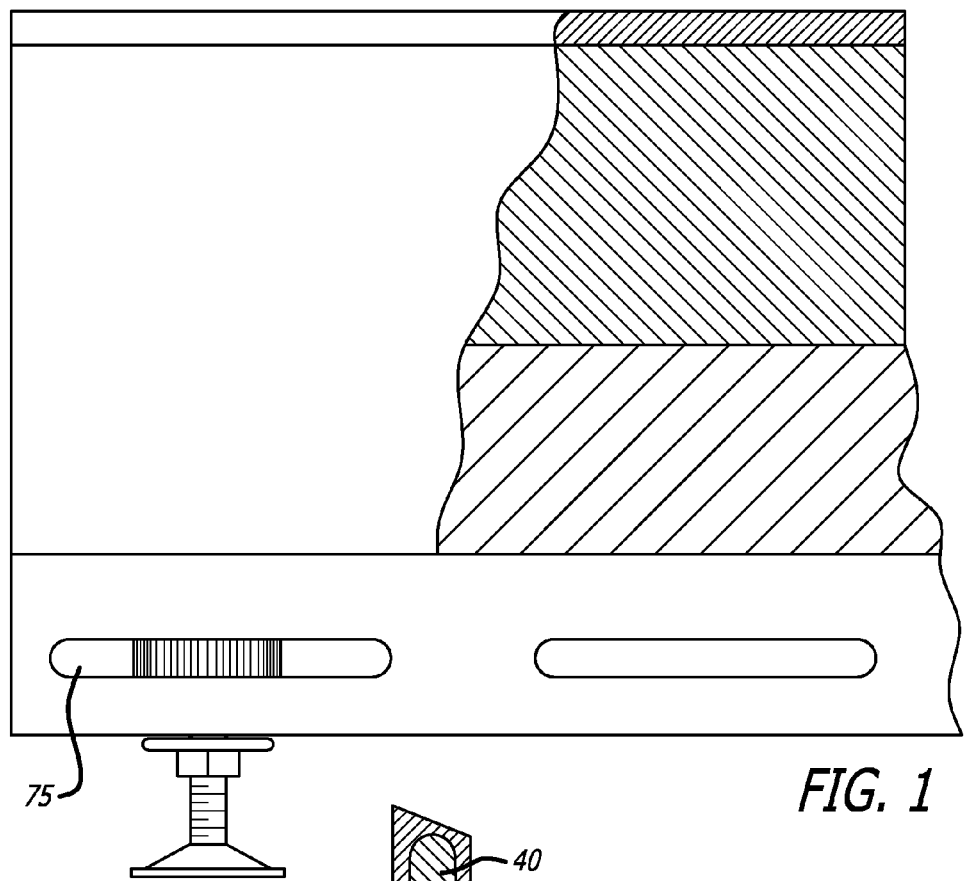
FIG. 1 is a side view of an aircraft monument panel mounted using a first embodiment of the present invention.

The present invention is a mounting system for securing compartment dividers, partitions, and walls of an aircraft that overcome the shortcomings of the prior systems. In a first embodiment shown in FIGS. 1-4, a pre-cured composite rail 20 is embedded into a panel 30 structure that forms the partition for the monument, where the rail 20 is preferably incorporated into the panel 30 during the manufacturing process. The rail 20 forms the anchor that supports the panel 30, and includes a spine 35 that extends into the panel's interior, which may be filled with carbon layers 40. The spine 35 terminates at a base 45 that includes a plurality of elongate slots 50 along the bottom surface that receive the attachment elements. As will be discussed below, the slots allow adjustment in a first linear direction, while the attachment elements allow further adjustment in the other two orthogonal directions.

Figure 2:
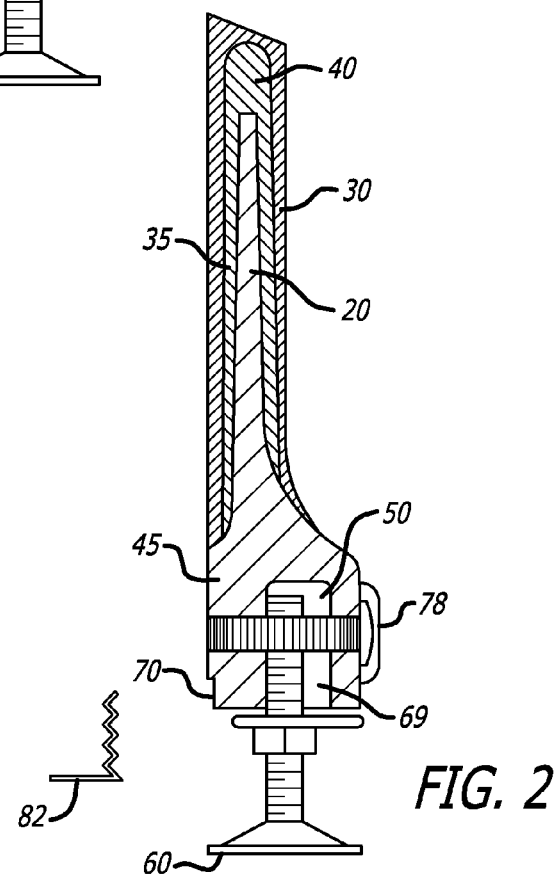
FIG. 2 is a cross sectional view of a mounting rail of the present invention.

FIG. 2 illustrates a cross section of the panel 30 and carbon fiber continuous rail 20 along with a first preferred floor attachment system for a CFRC panel. The rail 20 in a first preferred embodiment is integrated into the base of a monument's structural wall panels 30 during the primary manufacturing process. The rail 20 with the floor attachment 60 may be bonded into the panel 30 during manufacture, and has a carbon fiber rail spine 35 that is Co cured within the panel 30. The carbon fiber rail spine 35 is surrounded by additional UD carbon layers 40, with the CFRC structural panel 30 formed over the UD carbon layers 40. The rail 20 is mounted on an attachment component 60 that allows for adjustment of the position of the panel 30, shown in detail in FIG. 4. The attachment component 60 comprises a threaded poppet 62 using a locking nut 64 at the floor seal mounting point 70. The panel 30 may be positioned using an eccentric thumb wheel 66 and floating eccentric washer 68, which when rotated can drive the panel 30 via the rail 20 closer to or further away from the axis of the poppet 62 (see FIG. 5). The thumb wheel 66 projects through a slot 75 in the lowermost portion of the rail 20, allowing the panel 30 to be moved in and out of the pathway defined by the galley wall. The floating eccentric washer 68 includes a hexagonal projection 69 that engages the inner walls of the base of the rail 20 within slot 50, so that the washer 68 is captured within the slot 50 and accordingly, radial movement of the washer 68 due to its eccentricity displaces the panel 20 by the same distance. In this manner, the panel 30 can be moved laterally without disrupting the attachment of the monument to the aircraft structure. Moreover, the panel 30 can be lifted or lowered by selective positioning of the lock nut 64, which determines the height of the panel 30.

Figure 3:
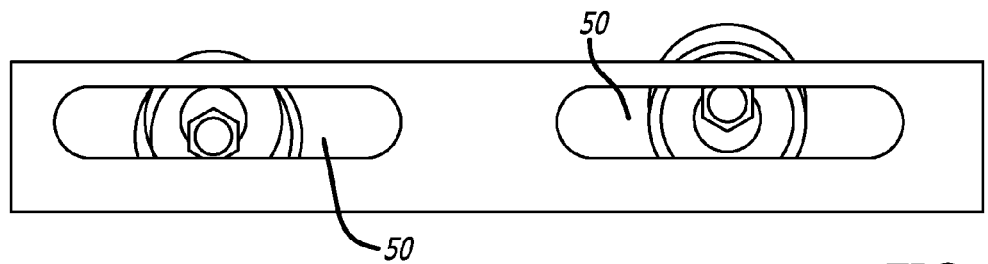
FIG. 3 is a view from below the mounting rail of FIG. 2.

FIG. 3 illustrates the range of lateral adjustment that can be achieved by the attachment component 60 as the thumb wheel 66 is rotated from one extreme to another. The eccentric thumb wheel 66 and washer 68 confine the projection of the attachment component 60 beyond the inner rail edge to as little as three millimeters (3 mm). The thumb wheel 66 is protected or covered by a plastic cover 78 or clip that mounts on the panel 20 over the slot 75 where the thumb wheel 66 projects as shown in FIG. 2. The base of the panel and attachment components 60 can be covered and protected for aesthetic and protective measures by a bellows-type floor seal 82.

Figure 4:
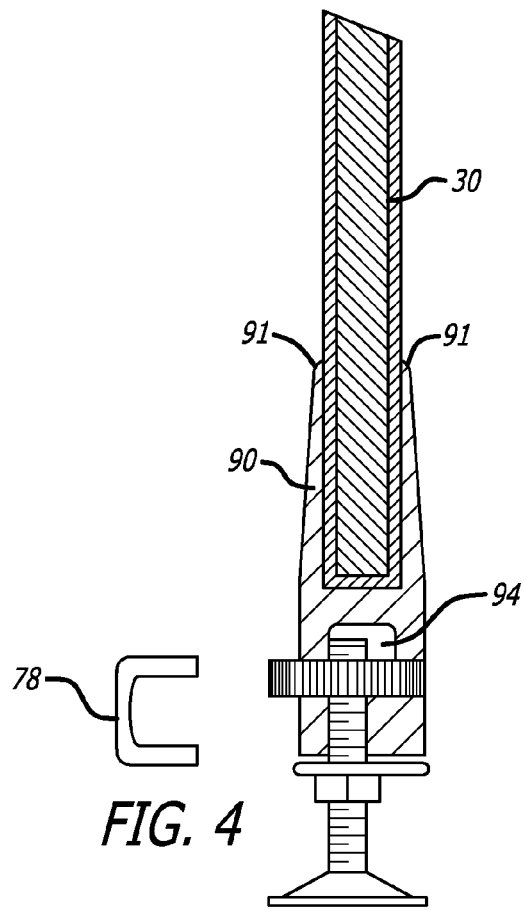
FIG. 4 is an alternate embodiment of a rail suited for flutter points.
Figure 5A:
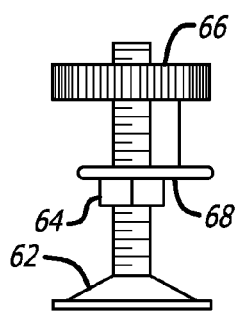
FIG. 5A is a side view of an attachment device including an eccentric thumb wheel and locking nut.
Figure 5B:
FIG. 5B is a side view of the eccentric thumb wheel of FIG. 5A.
Figure 5C:
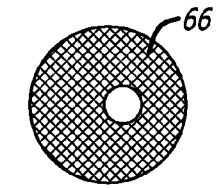
FIG. 5C is a top view of the eccentric thumb wheel of FIG. 5A.
Figure 5D:
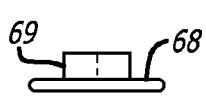
FIG. 5D is a side view of the locking nut of FIG. 5A.
Figure 5E:
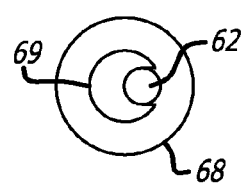
FIG. 5E is a top view of the locking nut of FIG. 5A.

FIG. 4 illustrates an attachment fitting for a flutter point, i.e., a supporting location that does not fix the monument in place but limits the degree of freedom that it can exhibit. The panel 30 is fitted with a attachment rail 90 having an upper recess for receiving the panel 30 therein, and a slot 94 similar to slot 50 of the rail 20 for receiving an attachment component 60 as discussed above. This configuration allows the panel to be shifted or lifted/lowered without relocation of the attachment components, and also does not require that the panel be manufactured with the composite rail 20. Rather, the panel 30 is formed on the attachment rail 90 that includes a pair of sides 91 that sandwich the panel 30 therebetween. The attachment rail 90 is mounted on a poppet 62 as before, using the eccentric thumb wheel 66 and eccentric washer 68, and operates in a similar manner as described above with respect to the panel formed on the carbon fiber rail of FIG. 2.

Figure 6:
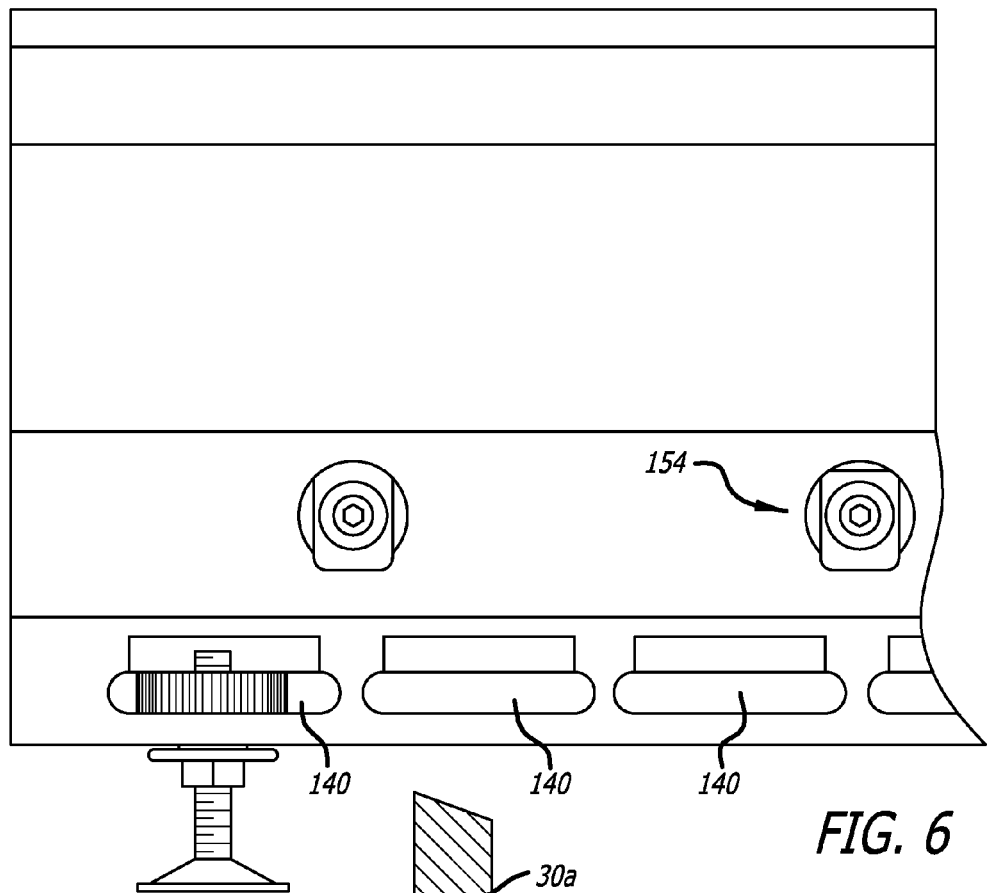
FIG. 6 is an alternate embodiment of an aircraft monument mounting rail.
Figure 7:
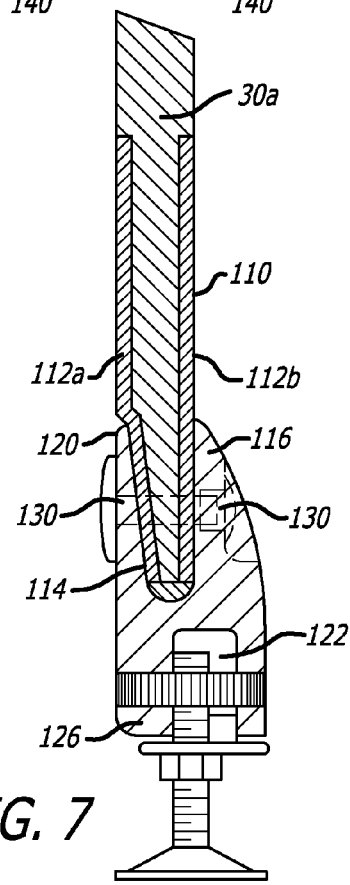
FIG. 7 is a cross sectional view of the rail of FIG. 6.

FIGS. 6 and 7 illustrate an alternative design for mounting and installing the standard and thermoplastic panels 30a utilizing both adhesive bonding and mechanical fixing to attach the rail to a pre-fabricated panel 30a. As shown in FIG. 7, a thermoplastic panel 30a includes a melded thermoplastic doubler 110 along its lower surface. The doubler 110 includes two substantially parallel plates 112a,b, where the first plate 112a converges with the second plate 112b along the bottom portion to form a wedge shaped structure 114. The wedge shaped structure 114 is inserted into an asymmetric carbon fiber rail 116 such that the first plate 112a is flush above the convergence with a vertical portion 120 of the rail as shown. The carbon fiber rail 116 includes a slot 122 that receives the poppet 62 with the locking nut 64, the eccentric thumb wheel 66 and eccentric floating washer 68 as described above, so that the rail 116 and the panel can be positioned away from the poppet 62 by rotating the thumb wheel 66. The carbon rail 116 has a generally rectangular base 126 with a pair of projections 130 that form a gap that receives the wedge shaped portion 114 of the panel. As shown in FIG. 6, the panel 30a is mounted on the rail 116, which in turn is mounted on the poppet 62 using the locking nut 64. Slots 140 on the rail 116 allow for other types of control adjustments in addition to the thumb wheel described herein, such as cams, levers, and other mechanical devices which can shift the position of the panel in a desired direction.

Figure 8:
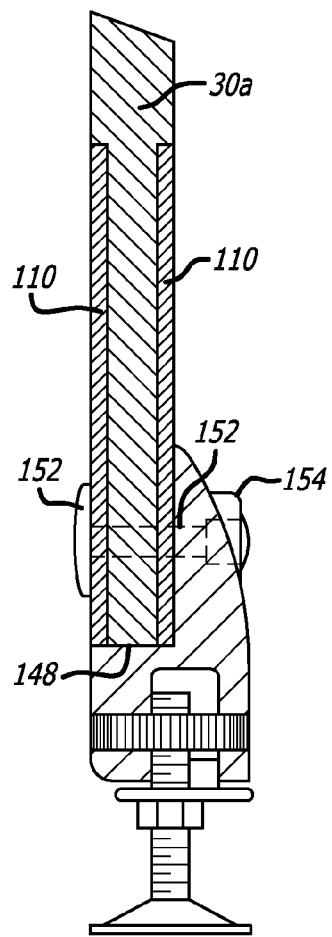
FIG. 8 is a cross sectional view of an alternate rail.

In FIG. 8, the rail is shown as open on one side (the second projection 130 is removed) and the panel's two plates 112a,b are parallel down to the bottom edge instead of converging to a wedge. In this embodiment, the panel 130a sits on an edge 148 of the rail, secured by a fastener 152 at the boss fixing point 154. The rail 30a is mounted on the poppet 62 as before, such that the position of the panel 30a can be altered by rotating the eccentric thumb wheel 66 to shift the panel 30a away from or toward the axis of the poppet 62.

Figure 9:
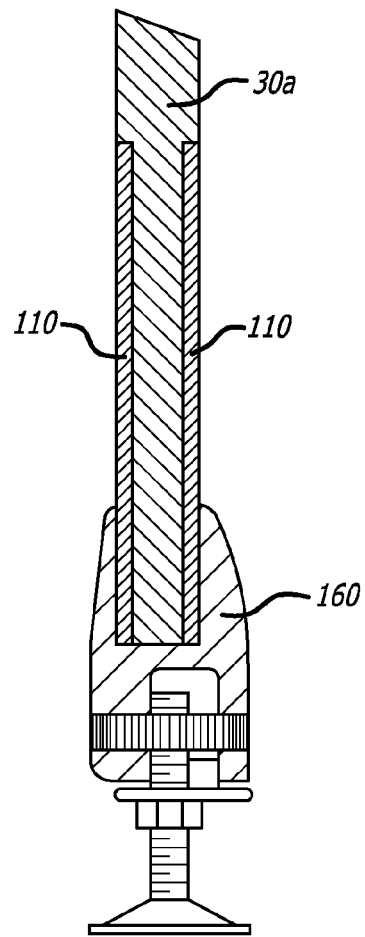
FIG. 9 is a cross sectional view of yet another alternate rail.
Figure 10:
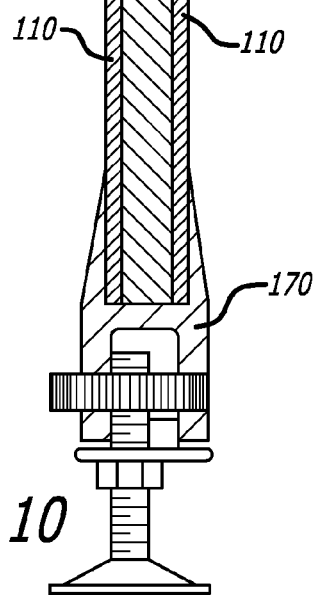
FIG. 10 is a cross sectional view of still another alternate rail.

FIGS. 9 and 10 illustrate yet other alternate embodiments of the rail. In FIG. 9, an asymmetric rail 160 receives a bonded panel 30a is seated in the gap formed by the respective projections. In FIG. 10, a symmetric rail 170 receives the bonded panel 30a.

These aforementioned attachment systems offer several advantages over current conventional floor fittings. For example, the carbon fiber rail can be incorporated as a continuous section simultaneously cured with the monument's structural walls for floor fitting purposes, as shown in FIGS. 1-2. Alternatively, the panel may be bonded into the rail for attachments carrying lighter loads such as flutter points as seen in FIG. 4. In addition, the floor fittings can be placed in multiple locations or a specific location with an increased span of X/Y adjustment depending upon the number and frequency of slots incorporated into the rail.

Another example of a benefit of the present invention is that the attachment component 60 may be completely integrated in to the monument structure during the primary manufacturing process. Moreover, the inward projection, i.e., that portion of the rail inside of the plane of the monument is significantly reduced, allowing standardization of cart compartment doors and standard guide/protection parts. The fittings described herein also serve to transfers load stresses directly into of the composite panel, improving the effectiveness of the load path. Where additional localized stiffening is required, extra plies of UD (uni-directional) carbon fiber can be added to the composite sandwich as an integral part of the panel itself.

The rail itself can be carbon fiber and either be laminated or press molded depending on the calculated strength requirements and/or advances in material capabilities. The rail is preferably designed to carry a bellows floor seal 82 for wet fitting. This bellows seal 82 would adjust for varying heights of the panel and keep moisture away from the fitting, extending the life expectancy of the fitting by reducing moisture and corrosive liquids from reaching the fitting.

The fittings described above allows X, Y and Z adjustment at monument installation without significantly increasing the inward floor fitting projection, which in some aircraft is limited to 12 mm maximum. Moreover, there is no exterior projection outside the galley envelope, which is favorable to prevent carts or passengers from catching on projections and the like. The rub strips are replaceable and their presence also act as covers for the rail slots and as wheel guides for the carts.

Figure 11:
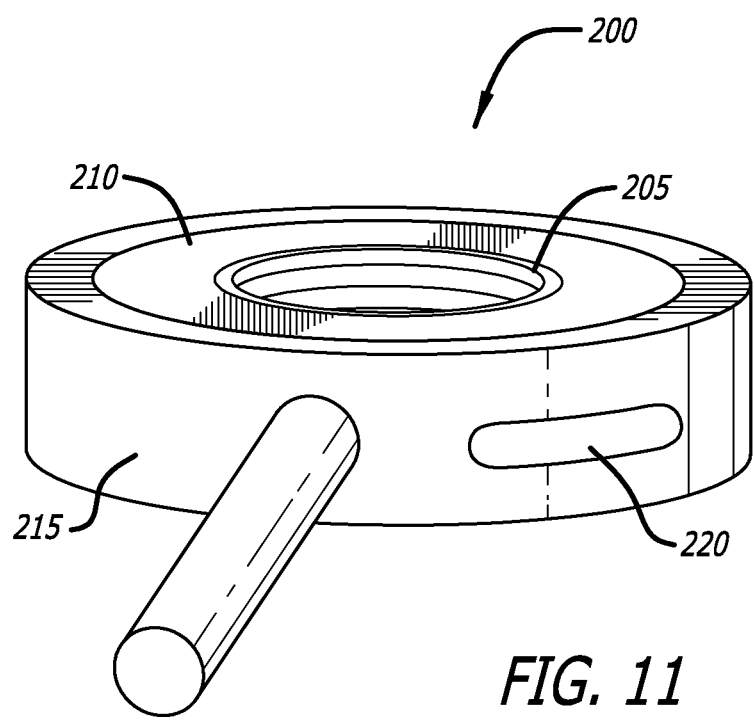
FIG. 11 is a perspective view of a locking ratchet element for use with the attachment component.

Another benefit of the present invention is that all the mounting and adjustment components can be standardized. The fittings further allow adjustment of the X/Y/Z position without additional tools and preferably provide a safety locking device, which is shown in FIG. 11. FIG. 11 illustrates a reversible ratchet lock 200 to replace a conventional lock nut 64. The reversible ratchet lock allows installation and adjustment without tools. It comprises an annular element that includes a ratchet structure working in the clockwise and counterclockwise directions, depending upon the position of a direction selector. A threaded lock nut 205 is positioned on the inner diameter, and the ratchet body 210 is enclosed by a cylindrical outer case 215. The reversible ratchet lock 200 includes a direction selector 220 and a thumb bar 225 to move the ratchet lock in either direction. The construction of the ratchet lock 200 eliminates the need for wrenches or other tools that would be needed to tighten the conventional locking nut.

In use, the invention allows aircraft monuments such as galley walls and the like to be installed and provide a greater degree of misalignment with aircraft hard points or seat tracks, and provides greater strength and load bearing capability. The adjustment features allow for fine tuning of the X/Y/Z position of a panel or monument at the fitting itself and removes the requirement for tools while reduces the intrusion into monument compartments of the floor attachment. This latter point allows for standardization of compartment doors, rub and bump strips, etc., and allows galley chilled carts to be installed without being offset to avoid wheel contact with conventional fittings. In addition, the adjustment fitting also removes a significant cold bridge in the case of chilled galleys, and long term problems caused corrosion of the metallic attachment are virtually eliminated. The present invention can be incorporated into all types of narrow or wide bodied commercial aircraft monuments both for new and existing airplane types or variants.

The foregoing descriptions and accompanying drawings are intended to be illustrative, and not limiting as to the scope of the present invention. One of ordinary skill in the art will readily recognize and appreciate modifications and substitutions of the various components that do not depart from the spirit of the invention, and the scope of the invention is intended to incorporate all such modifications and substitutions. Therefore, the scope of the invention is properly limited only by the words of the appended claims, using those words ordinary and customary meaning in view of this disclosure.

I claim:

1. An aircraft monument mounting system, comprising:
a rail adapted to support a panel thereon, the rail including a recess for receiving an attachment device from below, the recess having a width W, and a slot along a lower portion of the rail for accessing the attachment device;
an attachment device for mounting the rail, including a threaded fastener having a base that is wider than a threaded portion, a threaded support for establishing an elevation of the rail, an eccentric washer having a parallel sides spaced apart a distance that will allow the eccentric washer to fit within the recess of the rail and control movement thereof, and a mechanism for rotating the eccentric washer about the threaded fastener.

2. The aircraft monument mounting system of claim 1, wherein the threaded fastener is a poppet.

3. The aircraft monument mounting system of claim 1, wherein the mechanism for rotating the eccentric washer is a thumbwheel.

4. The aircraft monument mounting system of claim 1, wherein the thumbwheel is accessed manually through the slot on the rail.

5. The aircraft monument mounting system of claim 4, further including a protective cover over the slot to hide the thumbwheel.

6. The aircraft monument mounting system of claim 1, wherein the rail includes a spine that is formed with the panel during the manufacturing process of the panel.

7. The aircraft monument mounting system of claim 1, further comprising a bellows floor seal extending from said rail to a floor to hide the attachment device.

8. The aircraft monument mounting system of claim 1, wherein the panel sits in an opening along the top of the rail.

9. The aircraft monument mounting system of claim 8 wherein the rail is bonded to the panel.

10. The aircraft monument mounting system of claim 1, wherein the threaded support is a lock nut positioned below the mechanism for rotating the eccentric washer.

11. The aircraft monument mounting system of claim 1, wherein the threaded support is a locking ratchet positioned below the mechanism for rotating the eccentric washer.

12. The aircraft monument mounting system of claim 1, further comprising UD carbon layer between the panel and the rail.

13. The aircraft monument mounting system of claim 1 wherein the panel terminates at a lower surface in a wedge-shape, and the rail includes a wedge-shaped recess to receive the panel therein.

14. The aircraft monument mounting system of claim 1, wherein the panel is secured to the rail using a fastener through the rail and the panel.

\* \* \* \* \*